(12) United States Patent
Olsen, Jr.

(10) Patent No.: US 9,177,530 B2
(45) Date of Patent: Nov. 3, 2015

(54) HANDHELD DOCUMENT READING DEVICE WITH AUXILIARY DISPLAY

(71) Applicant: Brigham Young University, Provo, UT (US)

(72) Inventor: Dan R. Olsen, Jr., Orem, UT (US)

(73) Assignee: Brigham Young University, Provo, UT (US)

( * ) Notice: Subject to any disclaimer, the term of this patent is extended or adjusted under 35 U.S.C. 154(b) by 43 days.

(21) Appl. No.: 14/216,693

(22) Filed: Mar. 17, 2014

(65) Prior Publication Data

US 2014/0267026 A1 Sep. 18, 2014

Related U.S. Application Data

(60) Provisional application No. 61/789,059, filed on Mar. 15, 2013.

(51) Int. Cl.
*G09G 5/00* (2006.01)
*G09G 5/12* (2006.01)
*G06F 3/0484* (2013.01)
*G06F 3/14* (2006.01)

(52) U.S. Cl.
CPC ............... *G09G 5/12* (2013.01); *G06F 3/0484* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 5,467,102 A | 11/1995 | Kuno et al. | |
| 5,844,569 A | 12/1998 | Eisler et al. | |
| 6,124,851 A | 9/2000 | Jacobson | |
| 6,628,244 B1 | 9/2003 | Hirosawa et al. | |
| 7,176,848 B1 | 2/2007 | Dai et al. | |
| 7,242,369 B2 | 7/2007 | Huang | |
| 7,564,425 B2 | 7/2009 | Martinez et al. | |
| 8,462,124 B2 | 6/2013 | Cain et al. | |
| 8,502,833 B2 | 8/2013 | Tsai et al. | |
| 8,613,061 B2 | 12/2013 | Dvorak et al. | |
| 2012/0218191 A1 | 8/2012 | Huang et al. | |
| 2012/0240040 A1* | 9/2012 | Hase et al. | 715/273 |
| 2013/0086505 A1 | 4/2013 | de Paz et al. | |

FOREIGN PATENT DOCUMENTS

CN 102646008 8/2012

* cited by examiner

*Primary Examiner* — Kenneth B Lee, Jr.

(57) ABSTRACT

A method to display an electronic document includes receiving an electronic document, displaying a current page of the electronic document on a screen of a handheld device operated by a user, and displaying one or more adjacent pages of the electronic document on an external display. The method may also include changing the current page on the screen of the handheld device and the adjacent pages on the external display in response to user input. In some embodiments, the method includes pinning or unpinning one or more selected page(s) on the external display in response to user input. A corresponding apparatus, system, and computer readable medium are also disclosed herein.

22 Claims, 7 Drawing Sheets

HANDHELD DOCUMENT READING DEVICE WITH AUXILIARY DISPLAY

CROSS-REFERENCE TO RELATED APPLICATIONS

This application claims priority to U.S. provisional application 61/789,059 entitled "Expanding the e-Reader Display" and filed on 15 Mar. 2013. The foregoing application is incorporated herein by reference.

BACKGROUND

1. Technical Field

The subject matter disclosed herein relates generally to electronic documents and specifically to methods, devices and systems for reading and displaying electronic documents.

2. Discussion of the Background

Two of the most popular modern tools are the smart phone and the digital book reader device. These handheld devices include specialized hardware devices such as the Amazon Kindle or the Barnes and Noble Nook. In addition these include software book readers such as the Apple iBooks for the iPad or the Kindle reader on the iPad or numerous other smart phone, digital tablet, and netbook devices. Such devices typically have a screen sizes up to approximately the size of a physical book page.

The size of a handheld device is frequently small for purposes of portability and cost. However, small size can be limiting in many respects. A handheld device may not effectively show an image that is larger than the physical device. Many handheld device solutions allow the user to zoom in and pan around a page to access more detail but such behavior loses the context of whatever one is looking at. This lack of display space makes existing devices more suited for casual sequential reading rather than interactive learning. The lack of display space can also be problematic when viewing large pictures such as architectural drawings, complex chemical structures, maps, tables, graphs or other materials.

Even without such specialized book needs, there may be times when someone reading a text or other book wants to refer to multiple pages simultaneously. On standard handheld devices, particularly on smartphones such as an iPhone, this is not possible because there is not enough display space. Furthermore, when presenting information to others a handheld device often requires passing the device around to facilitate seeing the information on the screen.

Given the foregoing, what is needed are methods, devices and systems for reading and displaying electronic documents that provide more viewable space.

SUMMARY OF THE INVENTION

A method to display pages of an electronic document includes receiving an electronic document, displaying a current page of the electronic document on a screen of a handheld device operated by a user, and displaying one or more adjacent pages of the electronic document on an external display. The method may also include changing the current page on the screen of the handheld device and the adjacent pages on the external display in response to user input. In some embodiments, the method includes pinning or unpinning one or more selected page(s) on the external display in response to user input. A corresponding apparatus, system, and computer readable medium are also disclosed herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Applicant has observed that the portability of handheld devices is directly associated with their relatively small size. Consequently, such devices also have limited display space. However, Applicant asserts that the nomadic use of a handheld device does not preclude the use of external display surfaces that might be readily available, and common handheld devices have more than enough processing capability to render static page images for external display. For example, many desktop computers have displays that have a larger viewing area than the screens of handheld devices. Desktop computers, conference rooms, classrooms and study rooms may have multiple displays available. Table top computers such as the Microsoft PixelSense™ could also offer additional display space. The embodiments presented herein were developed in response to these observations and include an apparatus, system, computer readable medium, and method and for displaying an electronic document.

Figure 1:
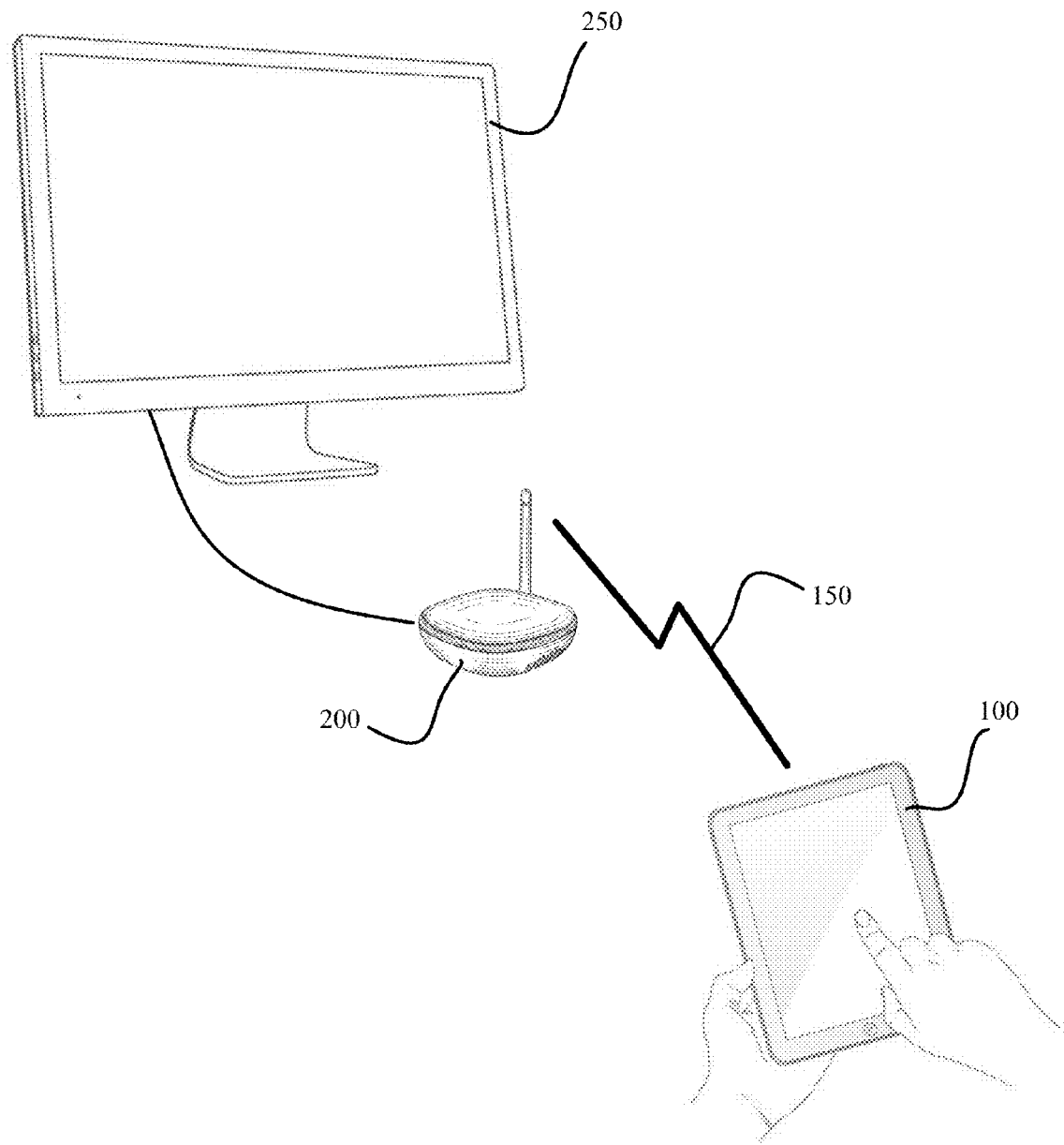
FIG. 1 is a perspective view drawing depicting one embodiment of a system for displaying an electronic document.

FIG. 1 is a perspective view drawing depicting one embodiment of a system for displaying an electronic document. As depicted, the system includes a handheld device 100 operated by a user, with the display 250 external to the handheld device that is controlled by a display server 200 wirelessly linked to the handheld device 100 via a network 150. As depicted, the user's hands are shown operating a handheld device 100 such as an iPad or Kindle or the like.

One or more additional pages adjacent to the current page of an electronic document (see, for example, FIG. 4) are displayed on the display 250 so the user can see additional context, or see pinned pages that stay in view on the display 250 for later reference, which will be subsequently described in detail. In one embodiment, the display 250 shows the pages immediately before and after the page the currently shown on the handheld device 100, and automatically updates the current page when the user navigates to a new page.

Figure 2A:
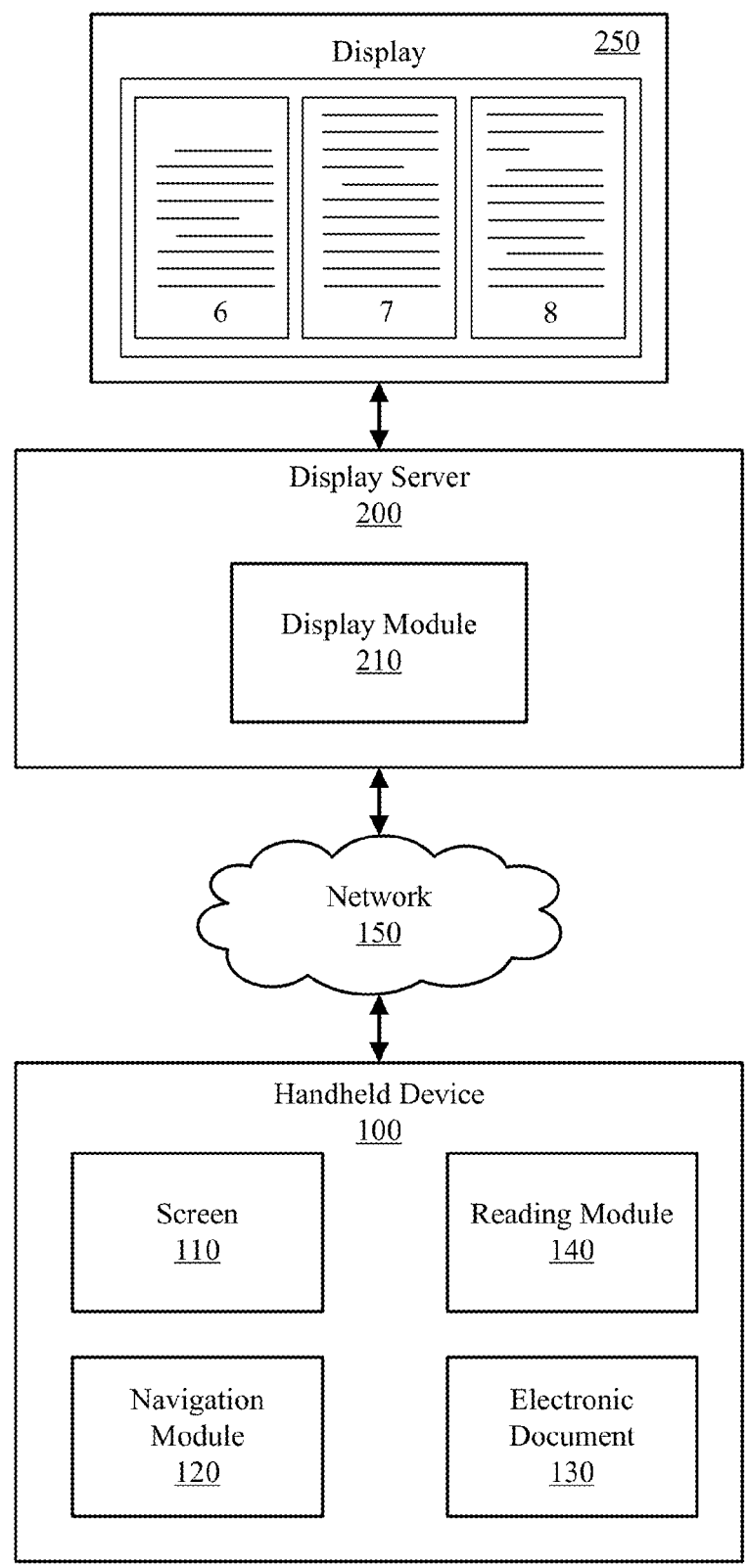
FIGS. 2A-2C are block diagrams several variations of an apparatus for displaying an electronic document.
Figure 2B:
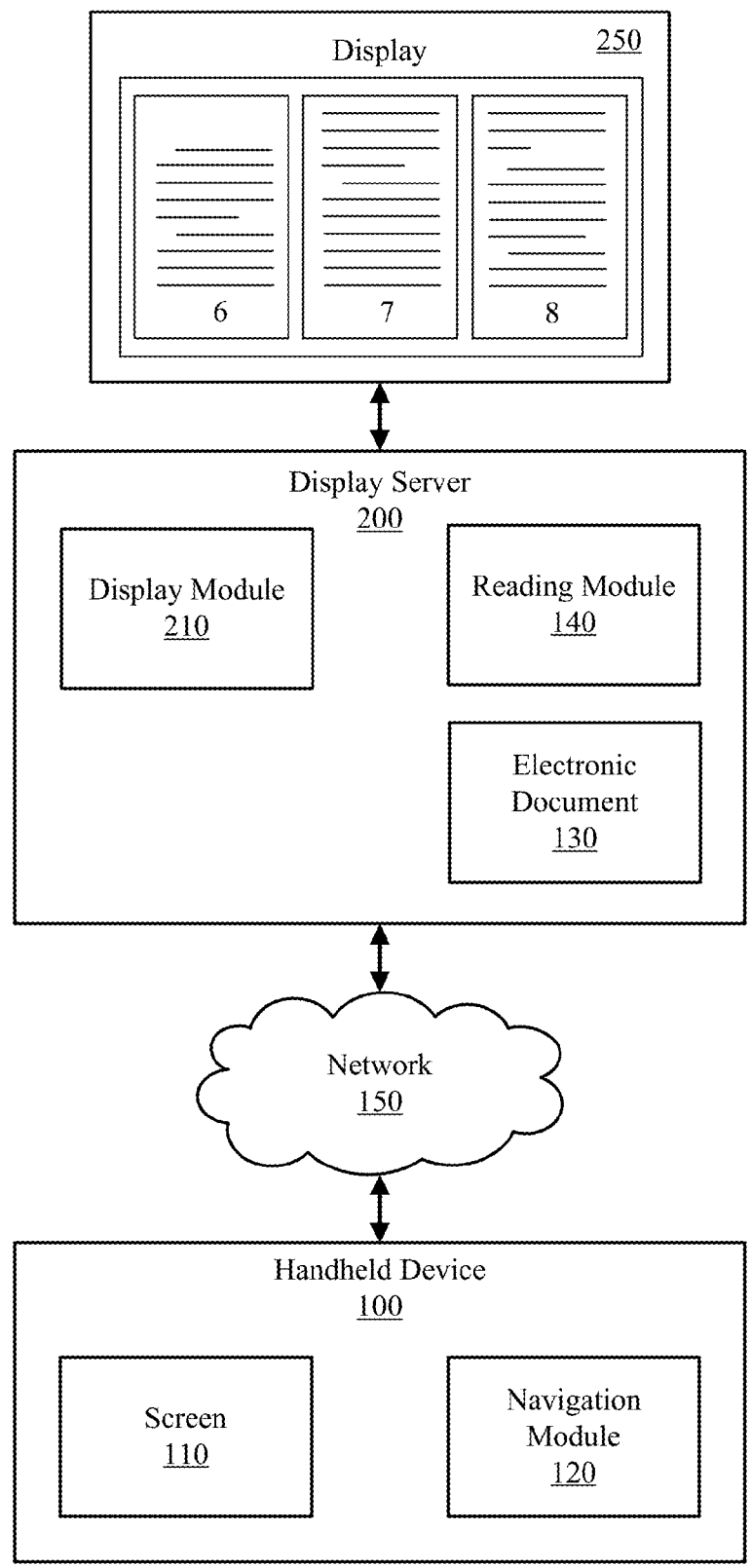
Figure 2C:
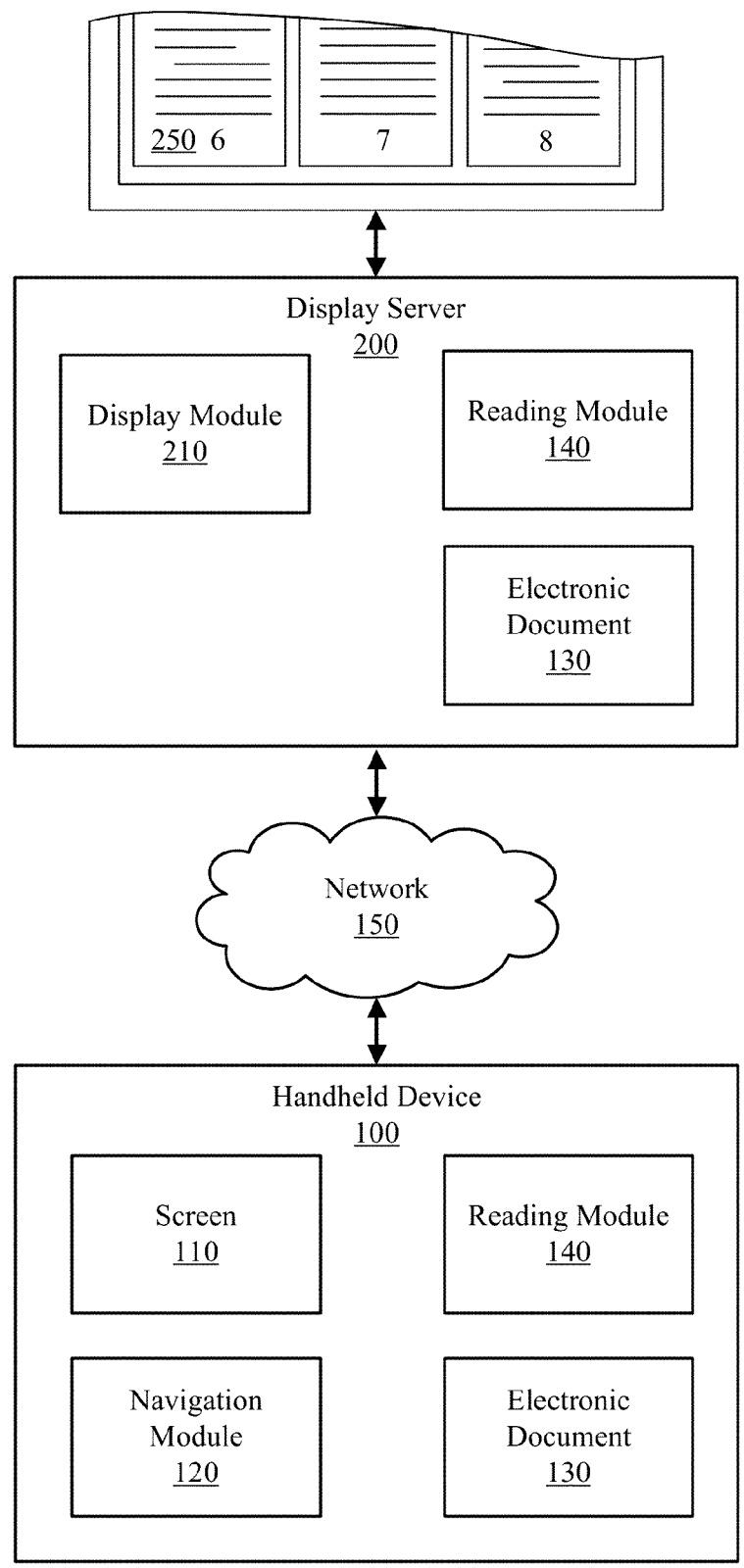

FIGS. 2A-2C are block diagrams of several variations of an apparatus for displaying an electronic document. As depicted, each variation of the apparatus includes a screen 110, a navigation module 120, an electronic document 130, a reading module 140, and a display module 210 that interfaces to the external display 250. The depicted modules enable display of the electronic document on the screen 110 of the handheld device 100 as well as the display 250 via the display server 200.

The navigation module 120 tracks user input on the handheld device 100 including the screen 110 and enables navigation through the electronic document by the user. For example, the user may request via a stroke action that the current page (that is displayed on the screen 110) be incremented or decremented. In some embodiments, the user indicates via numerical input which page is to be displayed on the screen 110.

The electronic document 130 may be any type of document suitable for viewing displayable content including an electronic book, a word processing document, an html document, a presentation document, or the like The reading module 140 receives navigation information from the navigation module 120 and moves to a corresponding location within the electronic document and extracts displayable content corresponding to the current page as well as adjacent pages. The content of the current page may be provided to a rendering module (not shown) on the handheld device for display on the screen 110. The content of the current page may also be provided to the display module 210 for display on the external display 250.

In addition to the current page, the reading module 140 may provide content for other pages including pinned pages and adjacent pages to the display module 210. In some embodiments, providing the content for other pages requires communicating to the display module 210 over a network such as the network 150.

One of skill in the art will appreciated that the described modules may be placed and/or partitioned on the handheld device 100 and the display server 200 in a variety of configurations. For example, FIG. 2A depicts a configuration where the navigation module 120, the electronic document 130, and the reading module 140 are located on the handheld device 100. In contrast, FIG. 2B depicts a configuration where the electronic document 130 and the reading module 140 are located on the display server 200. One of skill in the art will also appreciate that the electronic document 130 and the reading module 140 may also be placed remote to the handheld device 100 and the display server 200. For example, the electronic document could be an html document that is provided to the handheld device and the display server by a reading module located on a web server (e.g., a serving process executing on the web server).

In some embodiments, multiple local copies of the electronic document 130 may be accessed concurrently to reduce network traffic. For example FIG. 2C depicts a configuration where the electronic document 130 and the reading module 140 are located on both the handheld device 100 and the display server 200. In such a configuration, navigation commands such as 'change to the next page', 'navigate to a non-adjacent page', etc., that are obtained by the navigation module 120 may be provided to each instance of the reading module 140.

Figure 3:
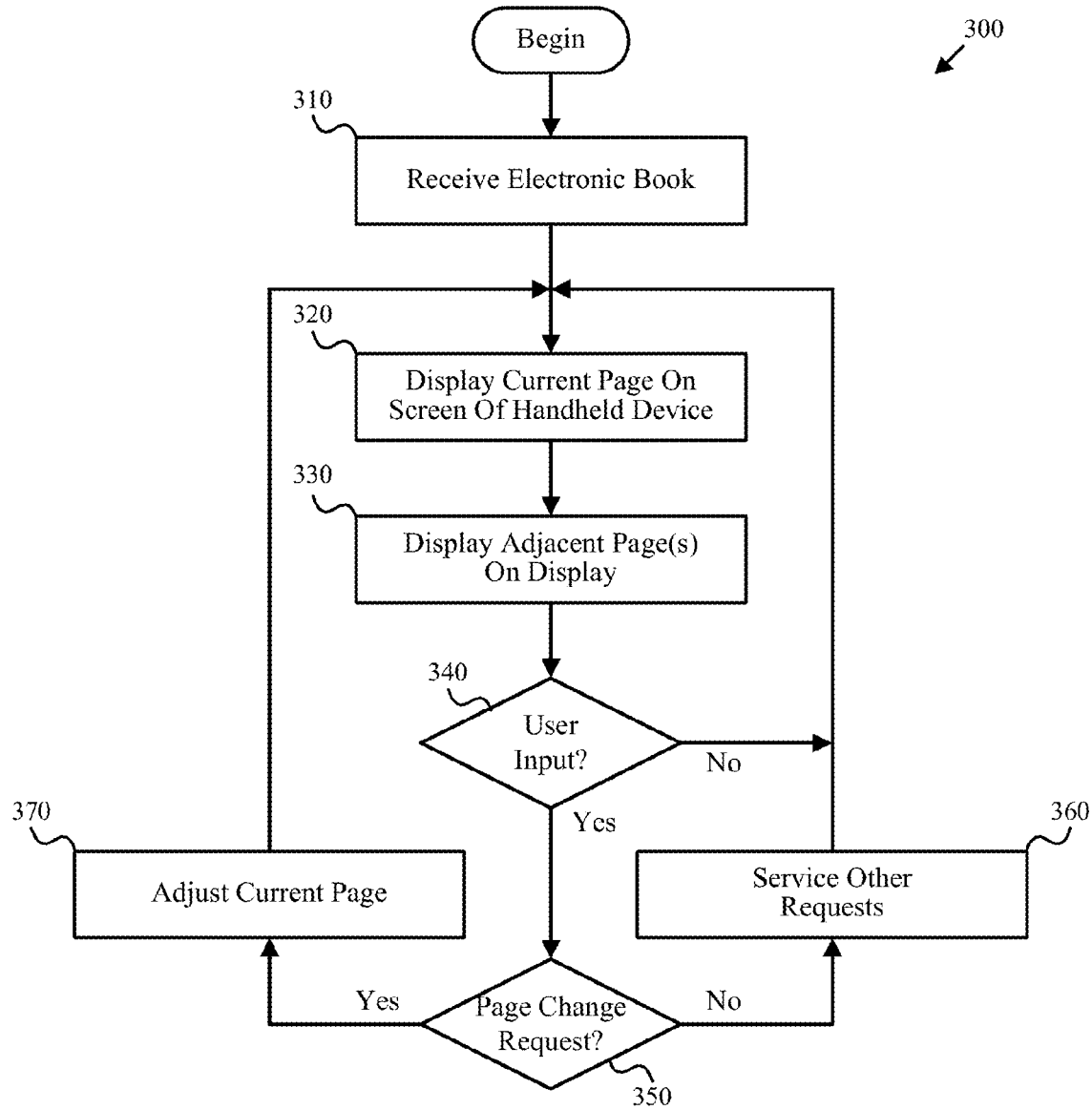
FIG. 3 is a flowchart depicting one embodiment of a method for displaying an electronic document.

FIG. 3 is a flowchart depicting a page display method 300 for an electronic document. As depicted, the page display method 300 includes receiving 310 the electronic document, displaying 320 the current page on a handheld device 100, displaying 330 adjacent pages on a display 250, testing 340 for user input and adjusting 370 the current page if the user inputs a page change request 350, and servicing 360 other user interface requests that are not page change requests. The method 300 enables a user and potentially other viewers to see one or more contextual pages for information that is displayed on the handheld device 100. In many environments, displaying contextual pages such as adjacent pages provides a number of advantages including providing a larger viewing area than is available on a handheld device 100.

Receiving 310 the electronic document may include downloading the electronic document from a content server, media server, web server or the like onto the handheld device 100 over a network or a set of interconnected networks, or over a temporary connection such as a USB connection, or by accessing a removable memory module such as a SD card. In some embodiments, the electronic document may also be stored in, or provided to, the display server and may be loaded onto the display server from a remote server over a network or an inter-network such as the internet.

Displaying 320 the current page on a handheld device 100 may include rendering the page in a conventional manner based on the user's selections of font size, etc., and placing the rendered page data in a memory dedicated to storing the current image for the screen 110. Displaying 330 adjacent pages may include rendering one or more adjacent pages for display on the display 250. In one embodiment, the display server 250 caches rendered pages so they may be redisplayed. Adjacent pages include one or more pages that immediately precede the current page and/or one or more pages that immediately follow the current page. If two pages are displayed on the handheld device, the adjacent pages would be those that precede and/or follow those two pages. In one embodiment, the rendering is all done on the display server, and one or more pages rendered for the screen 110 are transmitted to the handheld device 100 for viewing.

Testing 340 for user input and adjusting 370 the current page if the user inputs a page change request 350 may include monitoring the stream of user input data until a page change request is detected, then setting the current page to the new current page based on the user input. Once the new page is determined, the method loops back to the displaying step 320 to display the new page. Processing 360 other user interface requests that are not page change requests may include processing user requests such as requests to pin a page, unpin a page, or the like.

Figure 4:
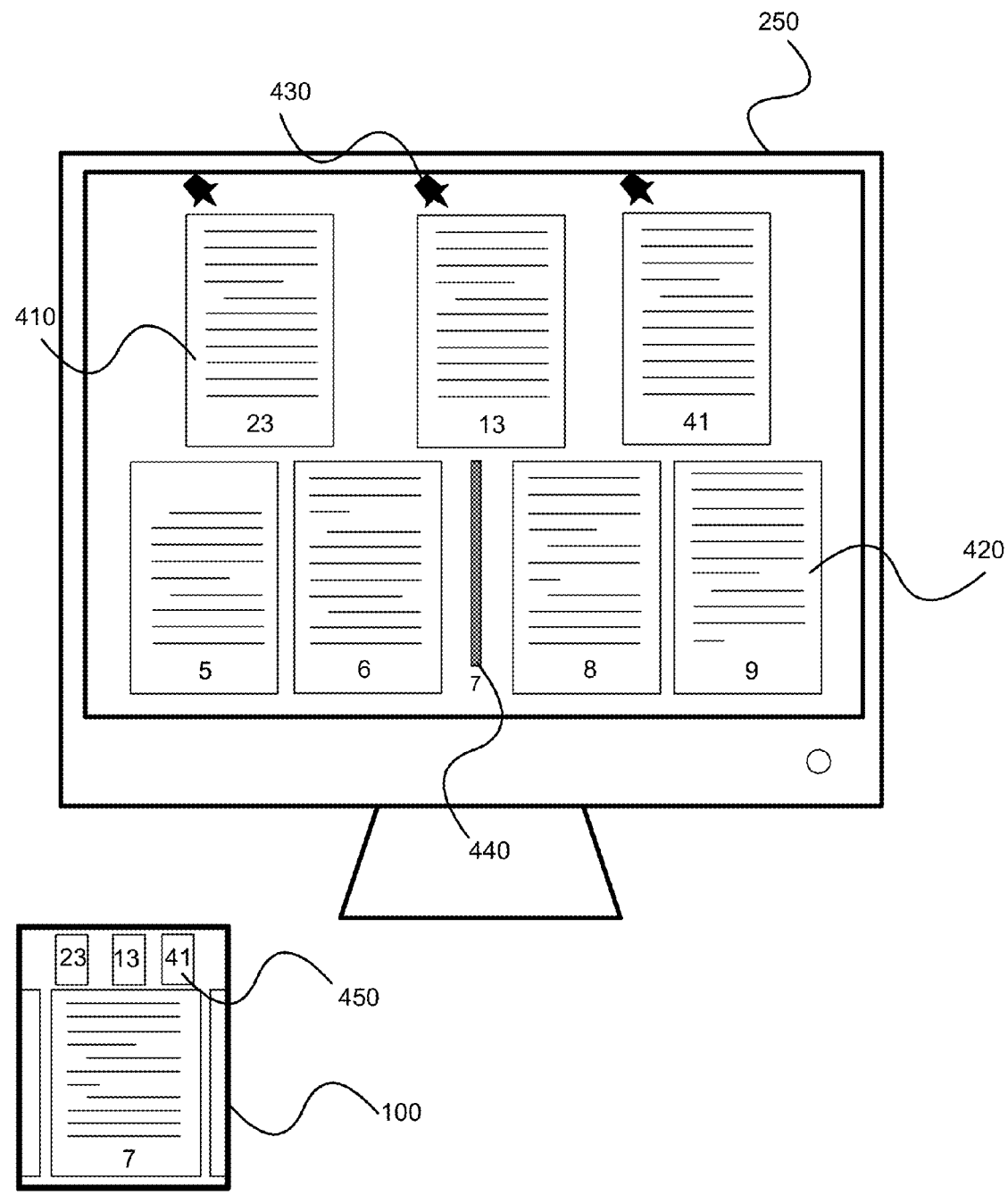
FIG. 4 is a front view drawing depicting a system displaying an electronic document with pinned pages.

FIG. 4 is a front view drawing depicting a system displaying an electronic document with pinned pages. In this embodiment, pages may be selected by the user for persistent viewing on the display 250 by means of user interface actions. The user interface actions could take place on the handheld device 100 or could take place on the display 250. The pages that are so selected will be referred to as being pinned, as if they were physically pinned to a bulletin board. Pinned pages stay in view even as the user changes the current page. Any logical user interface action could be used to indicate this action, such as clicking on a pin-shaped icon, making a swipe perpendicular to the direction used to swipe a page change forward or backward, or double-clicking on the page. Repeating the action could toggle the pinned status, or an opposite direction swipe could be so utilized. Pages that are pinned can be shown to be in a pinned state with a pinned icon 430, or by being separated from the adjacent pages with "white space", or by any number of other user interface indications that should be apparent to one skilled in the art.

In another embodiment of the invention, the non-handheld display 250 not only shows the adjacent pages and pinned pages, but it also shows a copy of the current page that is displayed on the handheld device screen 110. In the case of an especially large display 250, displaying the current page enables the user to see the current page in context without having to glance back at the handheld device 100. The user could select as a preference option if they wish the current page to always be shown on the display 250. In some situations the user may elect to exclusively display pinned pages which may or may not be adjacent pages. If there are more pinned pages than will fit on the available display area then some pinned pages may be "stacked" with the lower pages in the "stack" being only partially visible, or completely hidden. The page on the top of the stack may be chosen on the basis of being most recently pinned, or closed in number to the current page, or selected by a user interface action.

Pinning pages enables a user to not only more effectively access information in an electronic document stored on a handheld device, it could also be useful when interacting with a colleague with access to an available display. The user could make user interface commands to pin pages to the available display of their colleague, who could examine the pages while discussing them with the user.

In the depicted embodiment, the current page is not shown on the non-handheld display 250. However, a marker 440 is placed where the current page would be in the sequence of displayed pages. The depicted marker 440 is a vertical bar. However, any logical indicator may be used including an extra wide amount of "white space". Furthermore, the depicted embodiment includes a handheld device 100 with a reduced resolution view 450 (such as a thumbnail view) of the pages that are pinned on the display 250. Providing a reduced resolution view may enable the user to know what is being displayed on the display 250 without actually viewing the display 250. For example, a user may be able to communicate via a phone call to a remote party that may be viewing the content of the electronic document on a display that is proximate to the remote party. Consequently, the user and the remote party may interactively review and discuss the contents of the electronic document while at different locations.

Figure 5:
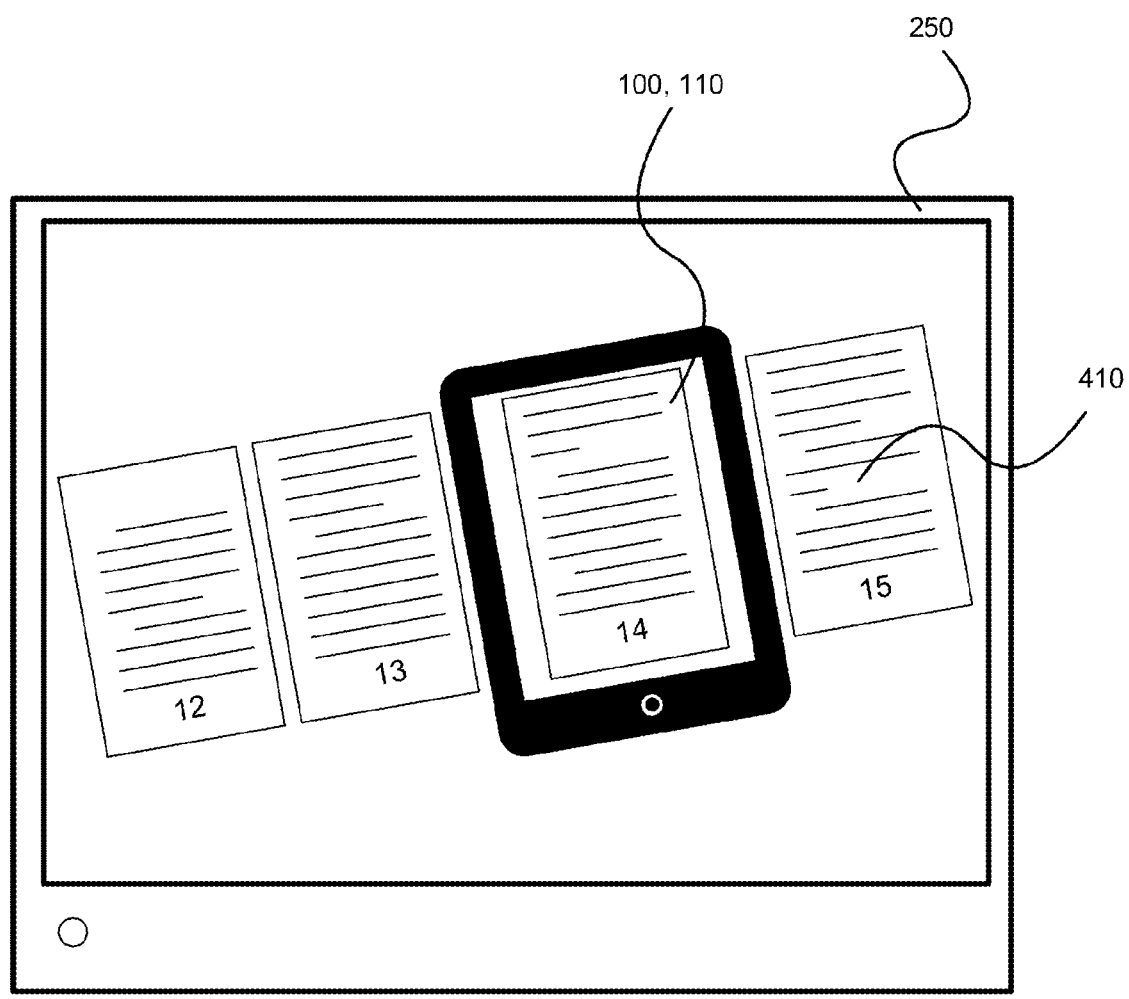
FIG. 5 is a top view drawing depicting adjacent pages that are displayed automatically when a handheld device is placed near the surface of a display.

FIG. 5 is a top view drawing depicting adjacent pages that are displayed automatically when the handheld device 100 is placed close to or against the surface of the display 250. For example, when the proximity of the handheld device 100 to the display is detected, one or more adjacent pages may be automatically displayed. In this example, the display is assumed to be orientated horizontally like a tabletop display. In the depicted embodiment, the adjacent pages are displayed in a manner as to appear adjacent to the current page displayed on the screen 110 of the handheld device 100.

In certain embodiments, pinned pages are remembered from a previous use of the handheld device 100 and are redisplayed on the display 250. In one embodiment, the user can select between multiple previous display configurations.

The preceding description provides a variety of examples regarding various embodiments of the claimed invention. In addition, the following definitions of terms may be consulted to clarify the spirit and intent of the subject matter disclosed herein:

Network: A network connects two or more computing devices such that they can communicate digital information among them. A network may use any of a variety of physical means for communicating digital information, including but not limited to: electrical pulses on a wire, light pulses through a fiber-optic cable or across some empty space, radio transmission, or sound through the air or other physical medium.

Inter-network: An inter-network is a superset of a network in that individual networks may be interconnected to increase the connectivity of the devices. Examples of an inter-network include in intra-network for an enterprise and the internet. However, as used herein the terms network and inter-network are intended to be used interchangeably.

Network address: A network address is a sequence of binary digits (frequently arranged in 8-digit bytes) that identifies a computing device on a network. When communicating over a network, a network address is used to identify the computing device that one wishes to communicate with. Examples of network addresses are Internet Protocol (IP) addresses (IPv4, IPv6 and others), Domain Name Service (DNS) names, and Media Access Control (MAC) addresses. In the process of communication an address, may be translated into another form of address such as DNS to IP or one IP address to another in Network Address Translation (NAT). The key idea of a network address is that it is a piece of binary data that identifies one or more computing devices that one wishes to communicate with.

Network message: A network message consists of a sequence of binary digits (frequently arranged in 8-digit bytes) that is to be communicated from one computing device to another over a network. Such messages consist of at least a network address that identifies the computing device to receive the message and the message content that consists of any number of binary digits that encodes the content.

Server: A server is a computing device that is connected to a network, has a relatively well known network address and can receive network messages that request services. A network address is relatively well known when all of the computing devices that need to request services from the server can readily obtain the server's network address. A server may perform any number of computational services, including but not limited to: storing information, supplying information, controlling physical devices, performing calculations and returning results.

Display Server: A display server is a server that has control over one or more display devices such as computer screens or projectors. A display server can receive network messages from one or more other computing devices. The received network messages contain instructions and information to be presented on the displays controlled by the display server. In addition, a display server may also send and/or receive network messages that provide control over the positioning of information on the displays or possibly authorization to have access to the displays.

There are multiple ways in which display server's, screens and computing devices may be configured. In one example architecture where a single display server controls one or more screens with a single network communications path between a computing device and the display server. In another example, display server architecture each screen or group of screens is managed by their own display server. One of the display servers is designated as the master display server. The computing device sends display messages over a network to the master display server which then forwards messages to the other display servers over a network. The computing device communicates with the master display server as if it managed the entire display space while the master display server delegates messages to other display servers.

All of these examples have the property that the display server architecture manages a set of one or more display screens as a single uniform display space and provides computing devices access to that display space by sending and receiving network messages to and from display servers.

There already exist a number of examples of display servers including VNC [Richardson 98], X-Windows [Sheifler 86], PostScript, Microsoft RDP and Wireless Pixels [Arthur 11]. Display servers may be simultaneously used by multiple computing devices.

Pixel: A pixel is a data representation for a single point of light on a two-dimensional surface. A pixel may consist of a single bit representing dark or light. A pixel may be a single number representing varying levels of gray ranging from dark to light. A pixel may consist of three numbers for each of the colors red, green and blue. Combinations of these color levels can represent virtually any color visible to the human eye. A pixel may also include an additional number to represent transparency or opacity.

Image: An image is a two-dimensional array of pixels where each pixel represents its own lighting value. This combination of pixels is easily converted into a visible image that can be perceived by a human being. Examples of images are the formats GIF, PNG, JPEG and others as well as the pixels transmitted by remote display systems such as VNC.

Rendering: Rendering is the process of converting some data structure into an image that can be displayed to a human being. There are many possible such data structures including eBook file formats such as ePub, HTML, Scalar Vector Graphics (SVG), and PostScript, to name a few.

Drawing: A drawing is a data structure that can be rendered into an image. In particular it is a data structure that consists of a list of graphics primitives. Graphics primitives are geometric shapes such as lines, circles, ovals, polygons, curves, images etc. The rendering process is one of taking each geometric primitive and performing its drawing operation that converts that primitive into pixel changes in an image. There are many graphics packages that define sets of drawing instructions from which a drawing can be assembled. These include X-Windows, PDF, PostScript or Microsoft RDP. A drawing may also be represented as a data structure of display primitives from which the visual presentation of the drawing. Examples of this include Microsoft WPF, Java FX, VRML, OpenGL or HTML.

Page: A page is a drawing or image that represents some portion of a much larger whole. For example a book may consist of a sequence of many pages. A set of drawings may consist of many pages. A collection of pages is rendered in some sequence. One can then reference a page by its page number. When a page is graphically rendered it may have page numbers rendered in the image.

These rendered page numbers are different from the page numbers discussed in this patent. A page may have a number N that indicates which page in the sequence of pages this is. Page number N−1 is the page that immediately precedes page N in the sequence of pages. Page number N+1 is the page that immediately follows page N.

Click: A click is a brief indicator of a particular two-dimensional point using some interactive input device. Examples include the press and release of a computer mouse button or a tap on touch screen with the finger or on a tablet with a stylus. The characteristics of a click are that a single two-dimensional point is indicated and that the expression of the point is brief.

Drag: A drag is an indication of the movement of some object on a display screen. A drag is initiated by the indication of a two dimensional start point. This start point is used to select the displayed object to be moved. There is then a movement phase where successive new two-dimensional points are input from the user. The object being moved may or may not follow the movement points and other highlighting action may or may not indicate the result of terminating the drag at that point. After one or more movement points there is a final drop point that indicates the two-dimensional point where the object should be dropped.

Examples of dragging include: Pressing a mouse button to start the drag, moving the mouse while holding down that button and then releasing that mouse button at the drop point. A stylus press, move and release can be used as a drag. A finger touch, hold down while moving and lift can be used as a drag.

Handheld Device: Such a device is most commonly a tablet, smartphone, net book, or any other computing device which can be effectively held and used by a user regardless of whether the user is in a sitting, standing or reclining position.

Current Page: When someone is reading a book there is a current page that is being read on the handheld device. That current page is the basis for many of the interactive techniques described below. A current page marker is any visual symbol that indicates where the current page being displayed on the handheld device would fit in sequence among the pages on the display server. The current page marker should be located in the order of the pages shown on the display server. The current page marker may be as simple as a wider region of white space.

Reading Axis: The reading axis is the direction that one would read for the particular electronic document. For example, a book's pages may be organized horizontally (as in most book reader software) or vertically as in PDF readers or HTML readers. The vertical or horizontal organization may impact the way the interactive techniques function. This organization is referred to as the book's reading axis and will be either vertical or horizontal. Specifically, the reading axis of an electronic document is determined by the person's perceived direction of movement of pages during the course of normal reading behavior.

Stroking Action: The term stroking action describes a finger swipe across the screen of a device. Such actions are commonly used to indicate that the user wishes to change to an adjacent page.

In summary, the methods, apparatuses, and systems presented herein provide a number of distinct advantages over prior art methods, apparatuses, and systems. It should be noted that many of the functional units described herein such as those related to image processing are identified as modules. Others are assumed to be modules. One of skill in the art will appreciate that the various modules described herein may include a variety of hardware components that provide the described functionality including one or more processors such as CPUs or microcontrollers, or programmable logic devices (i.e., hardware components) that is configured by one or more software components. The software components may include executable instructions or codes and corresponding data that are stored in a computer-readable storage medium such as a non-volatile memory, or the like. The instructions or codes may include machine codes that are configured to be executed directly by the processor. Alternatively, the instructions or codes may be configured to be executed by an interpreter, or the like, that translates the instructions or codes to machine codes that are executed by the processor.

It should also be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for displaying an electronic document, the method comprising:
   receiving an electronic document;
   displaying a current page of the electronic document on a screen of a handheld device operated by a user; and
   displaying an adjacent page of the electronic document on a display that is external to the handheld device, wherein the adjacent page is adjacent to the current page within the electronic document.

2. The method of claim 1, further comprising changing the current page in response to user input.

3. The method of claim 1, further comprising changing the adjacent page in conjunction with changing the current page.

4. The method of claim 1, wherein the user input comprises a stroking action on the screen.

5. The method of claim 1, wherein the adjacent page is an immediately preceding page or an immediately subsequent page.

6. The method of claim 1, further comprising displaying both the immediately preceding page and the immediately subsequent page on the display.

7. The method of claim 1, further comprising pinning a selected page on the display in response to user input.

8. The method of claim 1, further comprising displaying a pinned indicator proximate to the selected page on the display.

9. The method of claim 1, wherein the user input comprises a first stroking action on the screen that is substantially perpendicular to a reading axis.

10. The method of claim 1, further comprising unpinning the selected page on the display in response to additional user input.

11. The method of claim 1, wherein the additional user input comprises a second stroking action on the screen that is substantially opposite the first stroking action.

12. The method of claim 1, further comprising displaying the current page on the display.

13. The method of claim 1, further comprising wherein the display is substantially larger than the screen.

14. The method of claim 1, further comprising automatically detecting that the display and the screen are proximate to each other.

15. The method of claim 1, further comprising informing the user that the display is available to display one or more pages of the electronic document.

16. The method of claim 1, further comprising enabling the user to initiate display of the adjacent page of the electronic document on a display via a user interface action.

17. An apparatus for displaying an electronic document, the apparatus comprising:
   a navigation module configured to initiate rendering of a current page of an electronic document on a screen of a handheld device operated by a user;
   a display module further configured to initiate rendering an adjacent page of the electronic document on a display that is external to the handheld device, wherein the adjacent page is adjacent to the current page within the electronic document; and
   a reading module configured to receive the electronic document and provide the current page to the navigation module and the adjacent page to the display module.

18. The apparatus of claim 17, wherein the reading module is partitioned and synchronized across multiple devices that each have a local copy of the electronic document.

19. A system for displaying an electronic document, the system comprising:
   a handheld device operated by a user and configured to render a current page of an electronic document on a screen of the handheld device;
   a display server configured to render an adjacent page of the electronic document on a display external to the handheld device, wherein the adjacent page is adjacent to the current page within the electronic document; and
   a reading device configured to receive the electronic document and provide the current page to the handheld device and the adjacent page to the display server.

20. The system of claim 19, wherein the reading device is the handheld device.

21. The system of claim 19, wherein the reading device is the display server.

22. A non-transitory computer-readable medium comprising one or more executable instructions that, when executed by at least one digital processing apparatus, cause the at least one digital processing apparatus to:
   receive an electronic document;
   display a current page of the electronic document on a screen of a handheld device operated by a user; and
   display an adjacent page of the electronic document on a display that is external to the handheld device, wherein the adjacent page is adjacent to the current page within the electronic document.

* * * * *